3,047,861
AIRCRAFT TRAFFIC CONTROL AND SURVEILLANCE SYSTEM

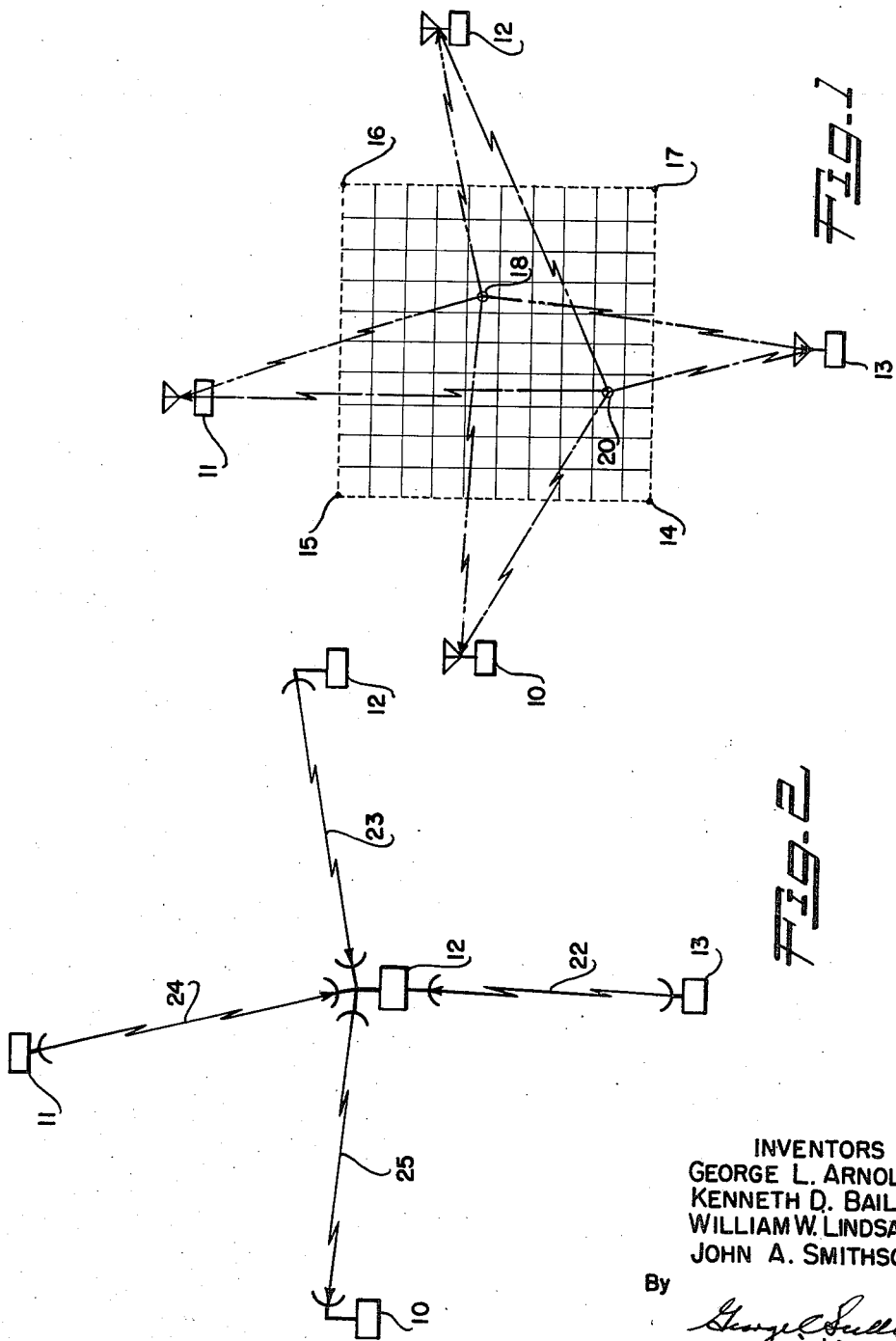

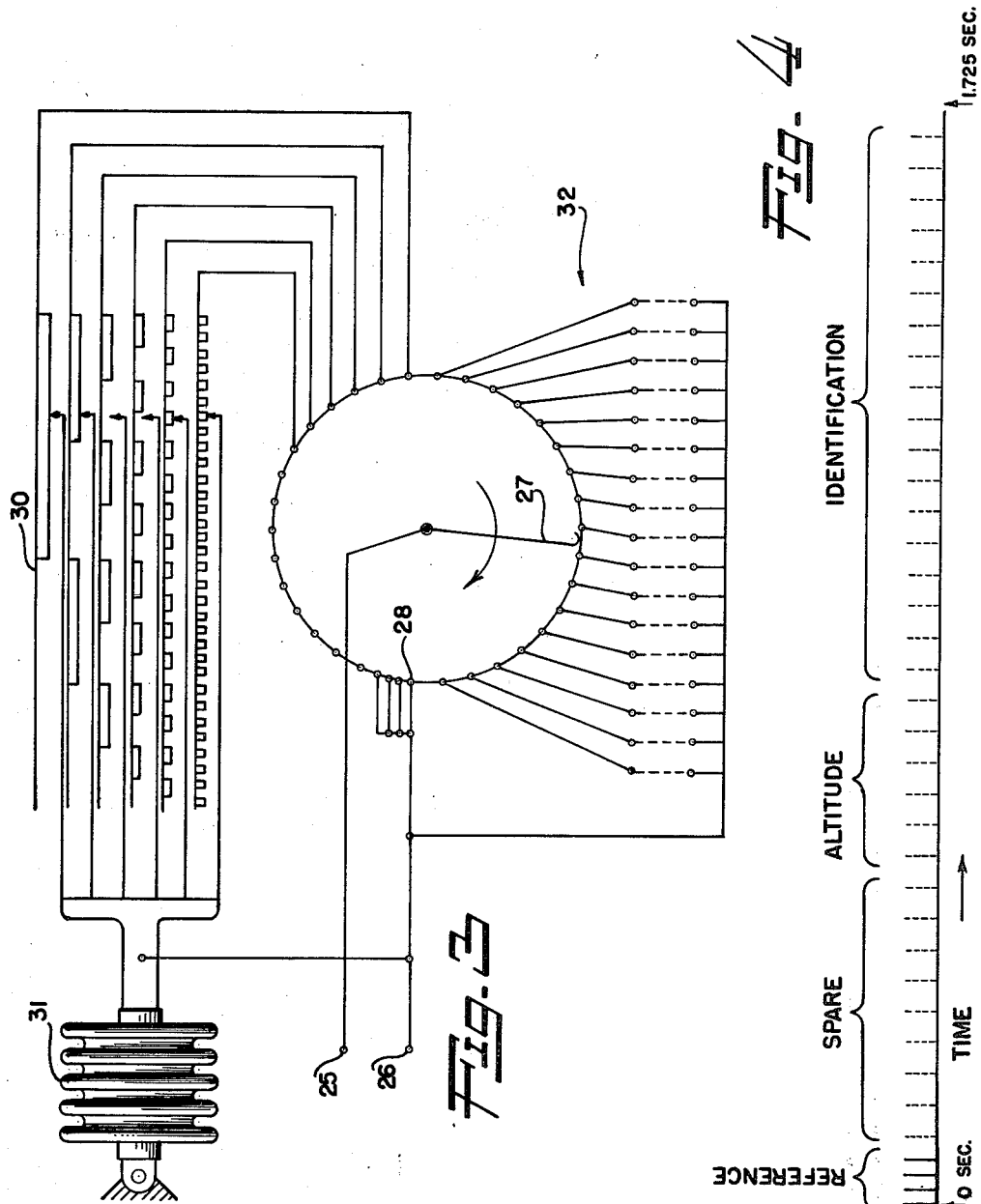

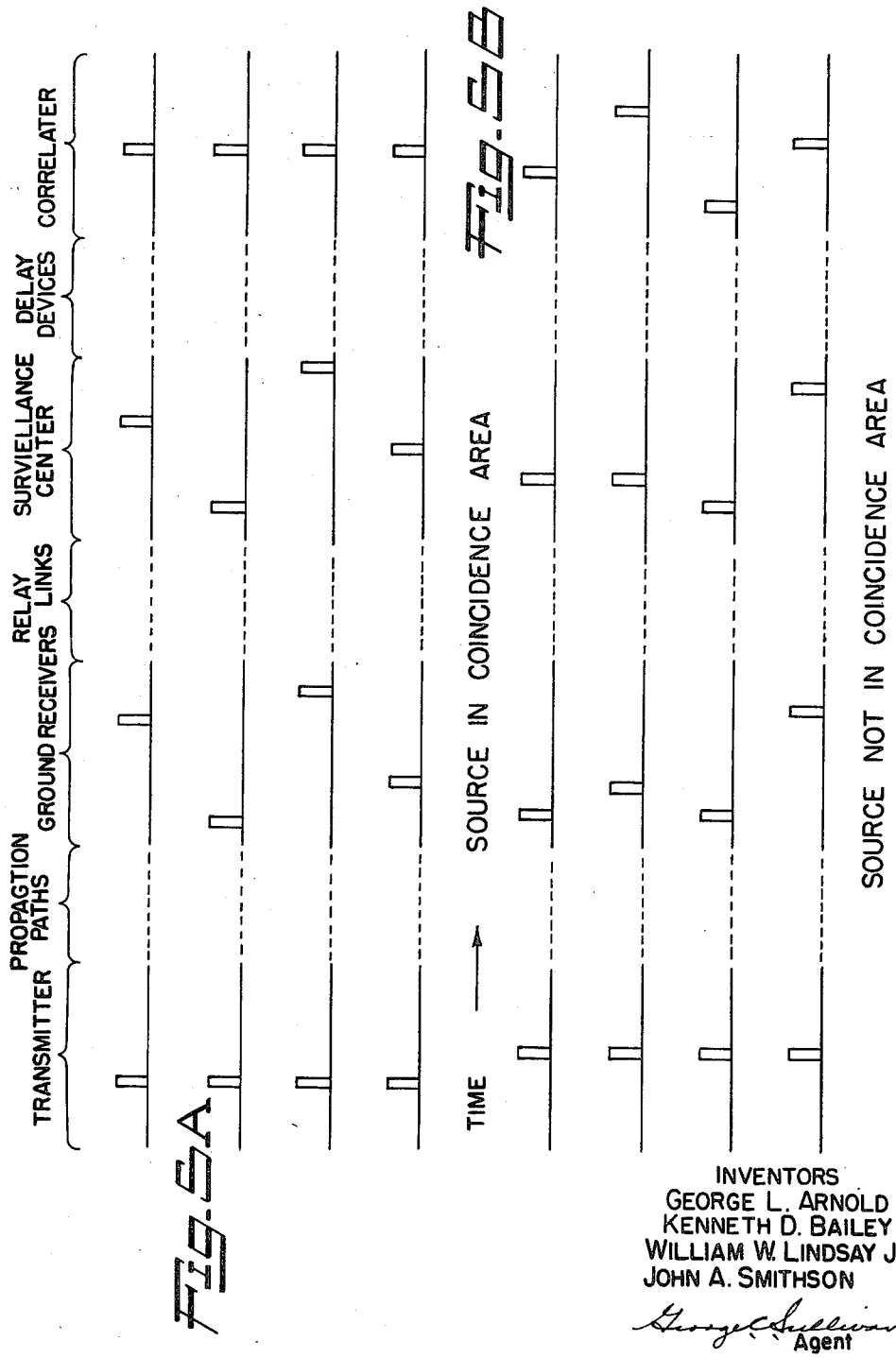

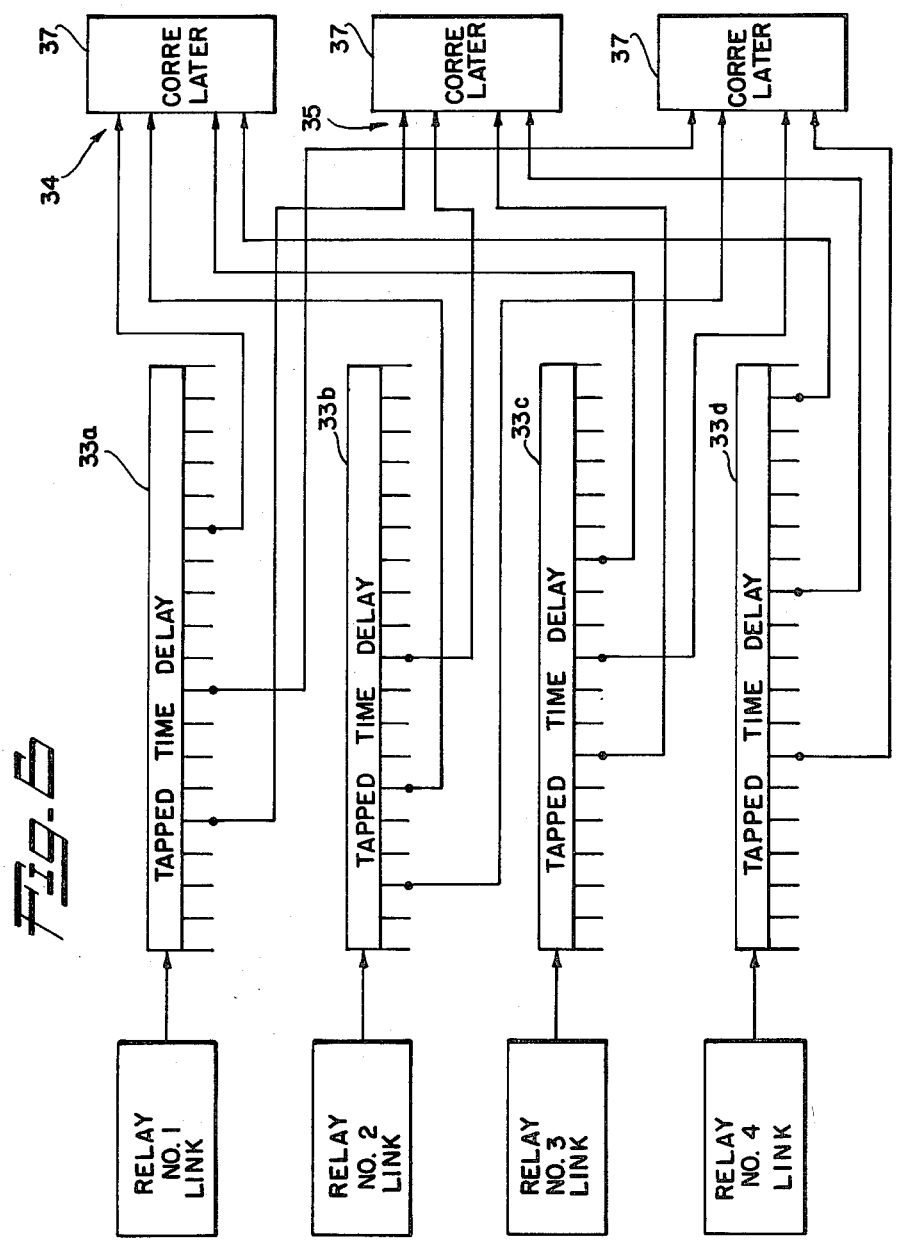

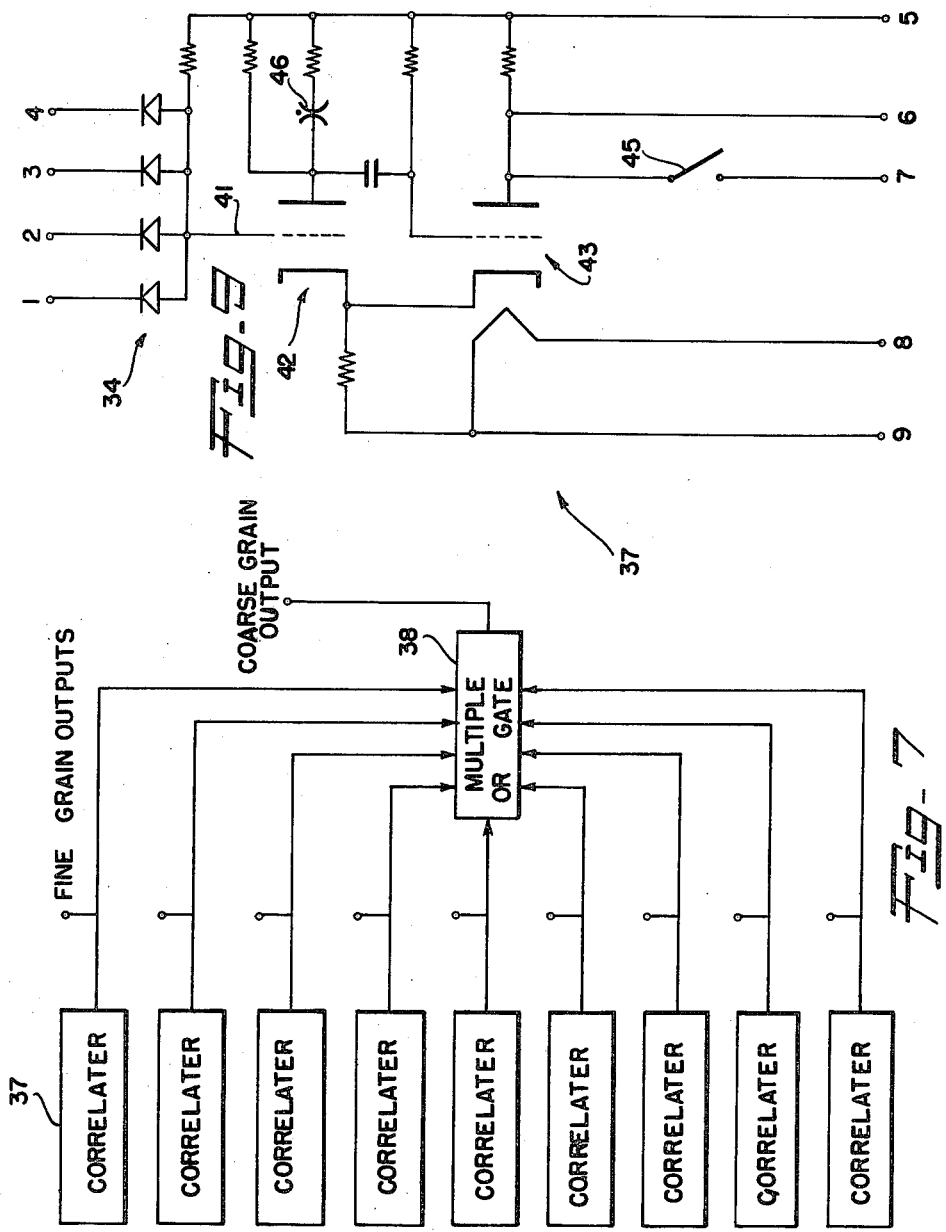

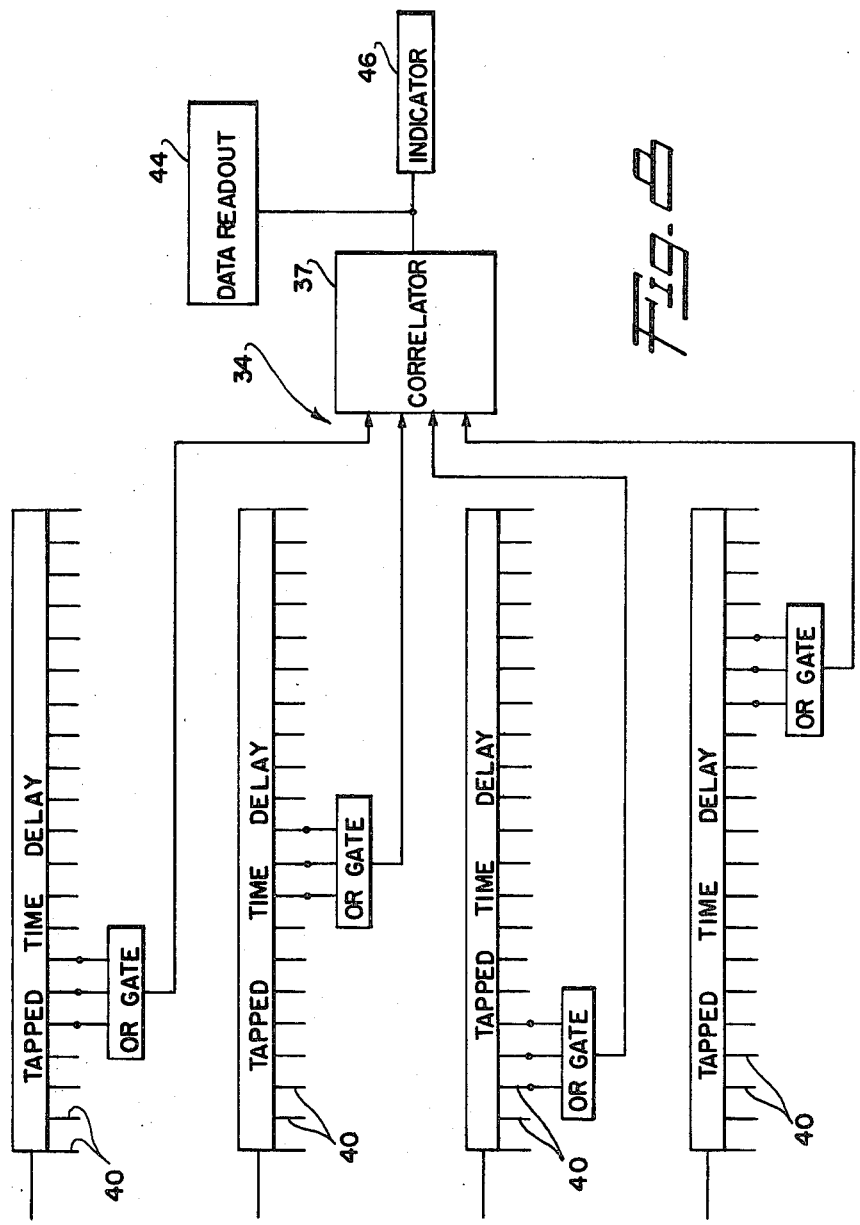

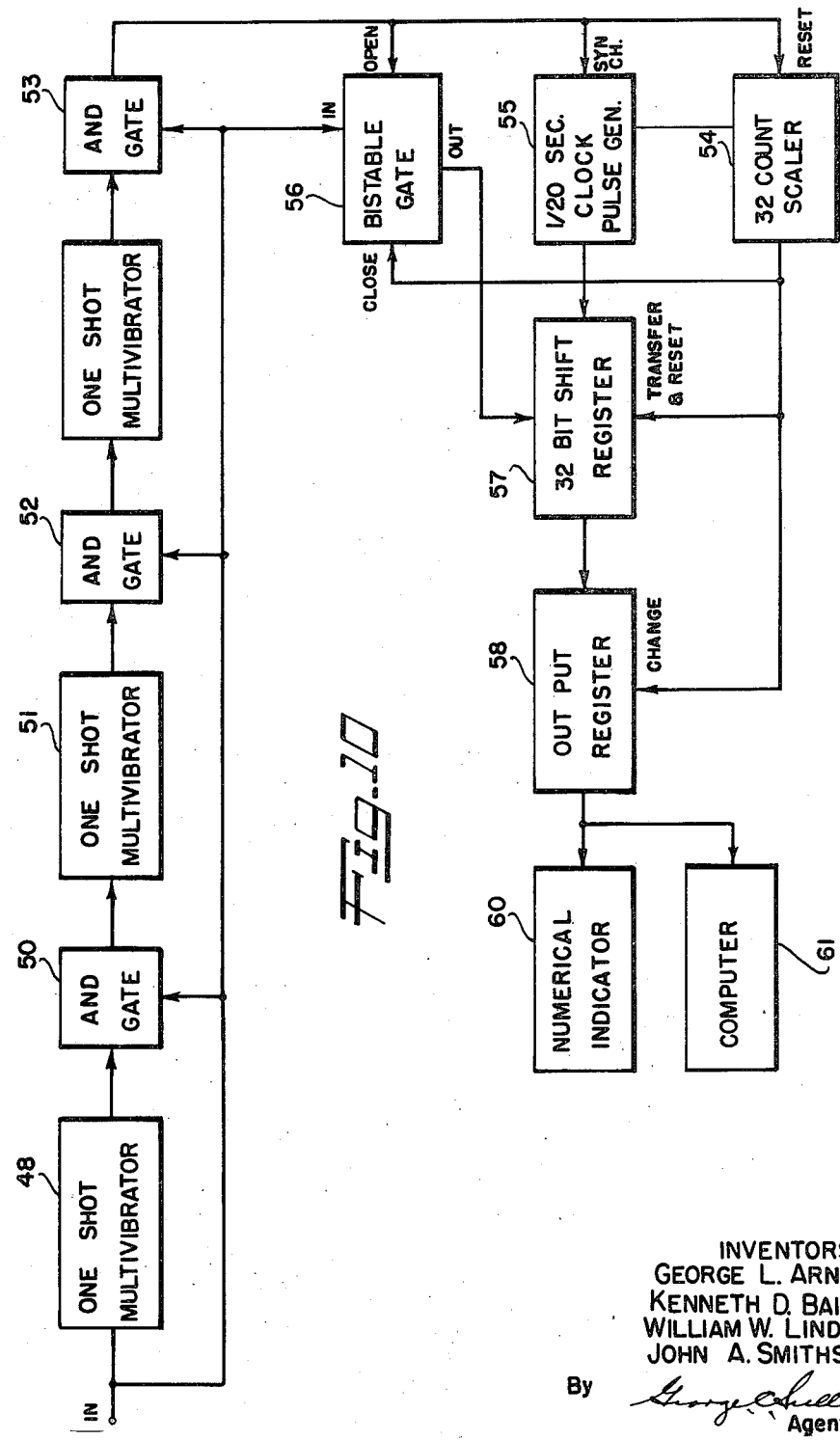

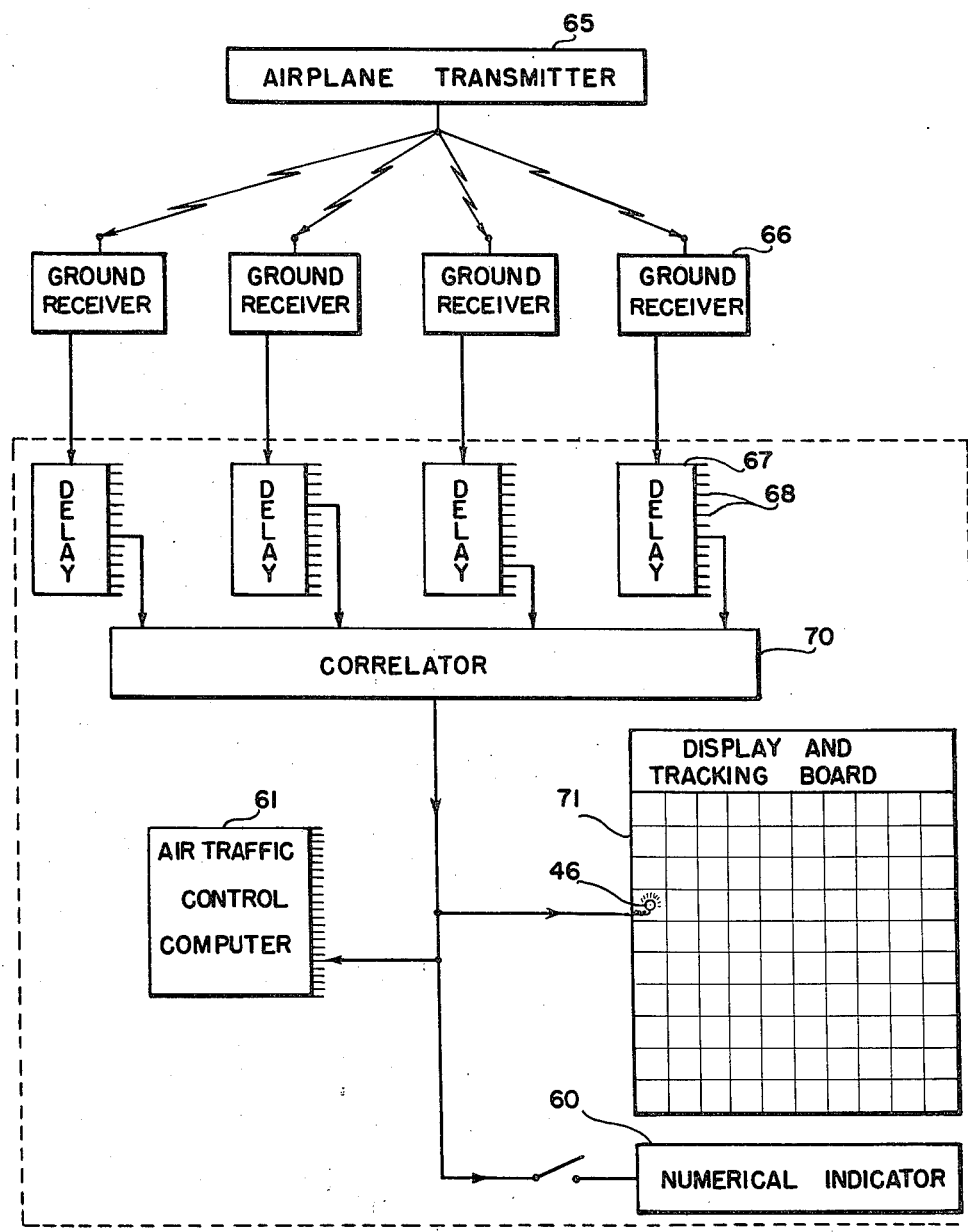

George L. Arnold, Granada Hills, Kenneth D. Bailey, Glendale, William W. Lindsay, Jr., Los Angeles, and John A. Smithson, Encino, Calif., assignors to Lockheed Aircraft Corporation, Burbank, Calif.
Filed June 25, 1959, Ser. No. 822,776
11 Claims. (Cl. 343—112)

This invention relates to traffic control systems for vehicles and more particularly to an integrated traffic control system providing for the orderly surveillance of a large number of vehicles simultaneously.

Although the difficulty of efficiently surveilling and handling aircraft while in flight has been recognized for a number of years, the recent steady increase in both the speed of the vehicles, aircraft in particular, and the volume of traffic has brought the problem to a critical state. Accordingly, the present invention provides a surveillance and tracking system which more suitably satisfies the requirements of navigation and traffic control than the prior art conventional systems which are currently available.

Therefore, it is an object of the present invention to provide a vehicle traffic control system which provides continuous surveillance of all, or any desired portion, of the space in the area of the system's capability and prescribed surveillance area.

It is another object of the present invention to provide a system employing a continuous indication of the presence, position and direction of travel of any suitably equipped vehicle carrying a continually transmitting device within the area of surveillance operating independently of any external stimulus.

Another object of the present invention is to provide essentially continuous information as to the identity of vehicles and in the case of aircraft, altitude, or other selected data, pertaining to each vehicle.

Another object is to provide a continuous indication of the present position of each vehicle in the surveillance area which suitably distinguishes between other vehicles in the same area.

Still another object of the present invention is to provide an indication of the consecutive positions of each vehicle in a surveillance area during a selected time interval so that the track (speed and direction) of the vehicle may be determined and future positions extrapolated.

Still a further object of the present invention is to provide a surveillance system in which the resolution in each direction may be chosen as appropriate to the situation. Each portion of the surveillance area may be provided with a given degree of resolution which is required without regard to the resolution requirements in other portions or surveillance areas. Any portion of the surveillance area may be simultaneously observed by two or more displays or indicators of differing resolutions. In other words, a fine grid may be overlaid on a coarser grid simultaneously.

A further object of the present invention is to provide a surveillance system in which all vehicles, such as aircraft, use a common transmitting frequency thereby conserving the over-all radio frequency spectrum.

Another object is to provide an aircraft surveillance system which does not furnish a potential beacon to unfriendly search equipment such as direction finder systems.

Another object of the invention is to provide an aircraft surveillance system having site redundancy so that operation may continue although one receiver site may be rendered inoperative.

Still another object of the present invention is to provide an aircraft surveillance system which imposes a minimum of penalty in weight and complexity of airborne equipment.

The above mentioned and other features and objects of this invention will become more apparent by reference to the following description taken in conjunction with the accompanying drawings, in which:

FIGURE 1 is a schematic representation of a typical surveillance area showing the general arrangement of ground receivers and showing at least two aircraft located within the surveillance area in accordance with the system of the present invention;

FIGURE 2 is a schematic representation showing the general arrangement of a central ground station relative to the arrangement of the ground receivers as shown in FIGURE 1;

FIGURE 3 is a schematic drawing of a coding matrix and a commutator means carried by an aircraft cooperating with the arrangement of receivers of FIGURE 1;

FIGURE 4 is a graphic representation of an information block of coded data as determined by the coding matrix and sequenced in serial fashion by the commutator means of FIGURE 3;

FIGURES 5A and 5B are a series of graphs showing the progression of coded data pulses initiated from the aircraft under surveillance to the equipment employed at the central ground station. FIGURE 5A shows the progression of data pulses transmitted from an aircraft within a portion of the area under surveillance while FIGURE 5B shows the progression of data pulses transmitted from an aircraft within the same area but from a different portion;

FIGURE 6 is a block diagram of the circuits and equipment employed in the ground station for processing the coded data pulses represented in the graphs of FIGURES 5A and 5B;

FIGURES 7 and 8 are block diagrams of a circuit suitable for deriving fine and coarse resolution;

FIGURE 9 is a circuit diagram of a correlator employed in the circuit of FIGURES 6 and 7;

FIGURE 10 is a block diagram of the circuit incorporated in the present system for recovering data from a correlator;

FIGURE 11 is a block diagram of the circuit and equipment of the system incorporating the present invention including display means.

With reference to the drawings, FIGURE 1 shows a typical surveillance sector or area having four radio receivers, 10, 11, 12 and 13 arranged at sites placed at the apices of an asymmetrical quadrilateral in order to illustrate the complete generality of the system. The associated surveillance area consists of the area within the quadrilateral 14, 15, 16 and 17 which need not be symmetrical or even quadrilateral. This quadrilateral is indicated as comprising a plurality of smaller quadrilaterals which represent an element or block of airspace. Two aircraft, 18 and 20, are shown within the surveillance area above defined, and each within an individually separated element or block of air space, along with their corresponding lines of radio wave propagation from airborne transmitters to each of the respective receivers.

FIGURE 2 illustrates the ground network associated with a typical surveillance sector. In addition to the four receiving sites 10, 11, 12 and 13, this figure shows a surveillance center or ground station 21 and a plurality of relay links 22, 23, 24 and 25 which connect it with the receivers.

The interoperation of the transmitters, receivers, relays and ground station equipment form an effective aircraft surveillance and tracking system. Referring to FIGURE 1, each of the aircraft 18 and 20 is equipped with a suitable radio frequency transmitter of sufficient power to insure that its radiation is being received by each of the ground receivers. These two transmitters and the four receivers, as well as all other aircraft transmitters and ground receivers operate on a single assigned surveillance frequency of, for example, 110 megacycles per second. Each airborne transmitter emits a signal, the characteristics of which influence the over-all system performance. Since the selection of ultimate system performance characteristics can vary, some of the factors involved will be described and the system operation will then be shown based on arbitrarily chosen, but reasonable, characteristics.

System resolution is a function of pulse duration, and is effectively limited by the distance traveled by a radio wave during one pulse. On the other hand, spectrum utilization goes up as the pulse duration is decreased. The system capacity i.e., number of aircraft which can be accommodated in a sector, is also dependent on pulse width as well as on the rate at which it is desired to transmit data (altitude, identity, etc.). For purposes of illustration, a nominal pulse recurrence frequency of twenty pulses per second, and pulse duration of one microsecond is chosen. The radio frequency output of the transmitter is fully amplitude modulated by the pulse train which, in turn, is modulated on and off in accordance with the identity and altitude of the aircraft. This information is coded in the following manner. Referring to FIGURE 3, the transmitter is so designed as to emit its pulsed signal whenever circuit continuity is established between keying contacts 25 and 26. This continuity is established in accordance with the desired code by a motor driven rotating arm 27, which commutates the circuits connected to the contact ring. The arm rotates at a speed so as to complete one rotation, and hence, one complete coding cycle in 1.725 seconds.

The cycle is initiated as the arm 27 contacts the first of the reference segments 28. The four reference segments are characterized by an intersegment spacing only half as great as that between the other segments. Because of this reduced spacing the airborne transmitter emits four pulses with an interval of only $\frac{1}{40}$ second instead of the normal $\frac{1}{20}$ second spacing. The decoder equipment in the ground station is synchronized by this four pulse sequence. Following the synch segments are nine segments to which no function has been allotted and these serve as spares which may be used to provide any additional data up to nine bits per cycle which may be desired. Next in the sequence are the six altitude segments. Each of these segments may or may not provide continuity depending on the position of an altitude coding card 30. This card contains six strips each of which is formed by conducting and non-conducting areas arranged in such a manner as to provide 64 uniquely definable positions. Although the "straight binary" coding is illustrated in FIGURE 3, any of the other well known codes are equally usable.

The position of the altitude coding card is determined by a barometric bellows, 31, which is actuated by the aircraft pressure altitude. By this means the transmitter output is coded to indicate aircraft altitude in 64 discrete steps.

Aircraft identity is encoded by the remaining 17 segments of the cycle. These 17 segments permit each of 131,072 aircraft to be assigned a distinct identification. The identification code assigned to each aircraft is set up at the time of equipment installation by removing those of the identity coding straps 32 which are appropriate. Having completed a coding cycle, the arm 27 again encounters the synchronizing segments 28, thus initiating a new coding cycle. The code cycle is repeated as long as the aircraft is in operation, transmitting essentially continuous data on aircraft position, altitude, identity, and other data which may be desired. Each item of data is renewed every 1.725 seconds, and in the case of position data, much more frequently, ten times per second on the average.

In FIGURE 4, one complete coding cycle is shown with those pulse positions allotted to synchronization, spare (other data), altitude and identification functions indicated.

The pulse modulated signals emitted by the airborne transmitter on aircraft 18 propagate in all directions at the speed of light. These signals are received at each receiving site at a time after their emission which is proportional to the distance of the aircraft from each site. The received signals are relayed to the surveillance center via relay links 1-4 shown in FIGURE 6 where complementary time delays are introduced in each signal path to compensate for any inequality in distances from the various receiving sites to the surveillance center.

The pulse train sequences on all compensator outputs are now identical, however, not necessarily coincident. This lack of coincidence is due to the differences in propagation time mentioned above. If suitable time delays are now introduced into each signal path by time delay devices 33, the four pulse trains can be brought into coincidence. Time delay devices 33 may be any suitable type such as magnetic drum, magneto-restrictive, etc. for example. Coincidence can be determined by using a quadruple "and" gate 34 the output of which will be a replica of the modulated pulse train generated in the aircraft.

Now reference will be made to signals transmitted from aircraft 20 with the same conditions existing as were described above in connection with the signals from aircraft 18 with the exception that different propagation paths are involved. As before the signals are received at the four receiver sites and relayed to the surveillance center. However, in this case the time relationships are different because of the different propagation paths involved. If these signals are now passed through the same set of delays previously used, the signals will not be brought into coincidence as illustrated in FIGURE 5B. Consequently, no output will be produced by the quadruple "and" gate due to the emission from aircraft 20. The time relationships existing among the various signals for the two cases considered above are shown in FIGURES 5A and 5B.

A second quadruple "and" gate 35 and another set of time delays is employed which is chosen so as to bring the pulses from aircraft 20 into coincidence so that the position of this aircraft can be observed by the surveillance system. Whenever the blocks of airspace represented by aircraft 18 or 20 are occupied, the corresponding "and" gate will be activated, producing at its output a coded pulse train from which the identity and altitude of the occupying aircraft may be derived. It is not necessary that each airspace element to be observed be provided with a separate set of delay lines. It is just as satisfactory, and much less costly, to use a single set of tapped time delays, and select the particular combination of taps which will be appropriate for each desired airspace element. Such a setup is shown diagrammatically in FIGURE 6. Although only three correlators 37 are shown, it should be appreciated that one correlator must be provided for each airspace element which it is desired to observe.

The one micro-second pulse width which has been chosen for our example provides a resolution in the center of the surveillance area of about one-sixth of a mile. That is, an aircraft one-sixth of a mile displaced from the center of the coincidence area would be ignored. This permits aircraft separated by more than about this amount to be individually distinguishable. Such high resolution may certainly be desired in the vicinity of airports or in areas of high traffic density. However, it appears likely that a much coarser resolution may be entirely adequate in some areas. In other cases it may be desired to in effect have two systems; one showing only the general position of each aircraft, while the other provides the fine grain data. There are two approaches which may be taken to achieve the coarser resolution. One necessitates a sacrifice in the number of aircraft which the system is capable of handling simultaneously at the coarser resolution, but is relatively more economical. The other involves no sacrifice in system capacity, but is considerably more expensive. In the case mentioned above where both coarse and fine resolution are desired in the same area, no increase in cost is incurred so the approach providing the greater capacity is to be preferred. Stated in other words, wherever only a coarse resolution is desired, it can be obtained at a lower cost than the fine grain system, but at a reduced system capacity. On the other hand, the substantially same system capacity can be maintained, but at no decrease in cost over the fine grain system.

The higher capacity method involves the multiplexing of the outputs of all correlators corresponding to the desired resolvable area. The multiplexing is achieved by using a multiple "or" gate 38 with its inputs connected to appropriate correlator outputs, and its output serving as the coarse grain surveillance output. This feature is shown in FIGURE 7.

With reference to FIGURE 8, the alternate, lower capacity method operates as follows. As the one micro-second pulses propagate along the delay lines each pulse passes all delay taps 40 of each delay device in turn. As a pulse passes each tap it produces a pulse of one micro-second duration on that tap. If the taps are spaced along the delay device at one micro-second intervals, any two adjacent taps will be excited in sequence with a one micro-second interval between. Since each pulse is one micro-second long and a one micro-second interval exists between pulses on adjacent taps, it is possible to combine the output from a number of adjacent taps to obtain a much longer effective pulse width. System resolution is an inverse function of pulse width, so the wider effective pulse gives a corresponding coarser resolution. However, system capacity is also an inverse function of effective pulse width and, therefore, decreases as resolution is coarsened in this manner.

A schematic diagram of the basic correlator 37 is shown in FIGURE 9. Two functions are performed in the correlator. The first is the recognition of the condition of quadruple coincidence of the four input signals. This function is accomplished by the four input diodes which constitute the quadruple "and" gate 34. When positive signals exist simultaneously on all inputs, a positive potential of sufficient amplitude will appear on the input grid 41. By this means those pulses which arrive coincidently and those which arrive randomly are selectively differentiated. Although the signal out of the "and" gate contains the information needed, its energy level is too low to be used directly because of the extremely short duty cycle and high source impedance. It is, therefore, necessary to use an amplifier, which is this case takes the form of a one shot multivibrator consisting of the two triode sections 42 and 43 of a vacuum tube. When triggered by a positive grid pulse, the circuit produces a high energy output pulse of approximately twenty milli-seconds duration. This pulse is suitable for direct use by a data decoder 44 of FIGURE 8 when desired or continuous use by the computer. It is contemplated that only a few data readout devices will be installed in each surveillance center, and any correlator from which data readout is desired would be connected to a data readout device by means of the data output switch 45.

In addition to producing the data output pulses, the one shot multivibrator also produces a visual outbut by developing a current pulse through a neon glow lamp 46.

It is not sufficient to indicate only the presence of each aircraft, but the identity and altitude data contained in the signal pulse train must be decoded. Since each consistent pulse from the correlator corresponds directly to a transmitted pulse, all information transmitted by the aircraft is available in the pulse train output of the correlator. The data readout means by which data is recovered is shown in the block diagram of FIGURE 10. Two prime functions are performed by the data readout means; synchronization and decoding. First, the synchronization process will be discussed. As set forth above, the synchronization signal consists of four pulses having only half the normal interpulse spacing. The problem is to recognize this four pulse sequence. Each pulse from the correlator triggers a first one shot multivibrator 48 which produces a pulse of $\frac{1}{30}$ second duration. The multivibrator output pulse activates one input of an "and" gate 50 so that any subsequent pulse from the correlator occurring within this $\frac{1}{30}$ second period will cause an output from the "and" gate. Since in the normal sequence, the interval between pulses is $\frac{1}{20}$ second, the second pulse arrives too late to pass the "and" gate. However, during the synchronization interval the second pulse will arrive only $\frac{1}{40}$ second after the first, and will trigger a second one shot multivibrator 51. An identical pulse interval discrimination process occurs in a second and a third "and" gate 52 and 53. The three gates and multivibrators have been included to increase the immunity of the synchronization technique to random pulses. Occasionally a random coincidence will occur to cause a pair of pulses to appear within $\frac{1}{30}$ second; however, the probability of this occurring three times in succession in vanishingly low. After the first three synchronization pulses have activated the third "and" gate, the fourth synchronization pulse is passed through the date to start the decoding function.

Three tasks are performed by the last synchronization pulse. First, it resets a 32 count scaler 54 to zero. Second, it establishes the phase of a clock pulse generator 55. Thirdly, it opens a bistable gate 56 thereby permitting succeeding data pulses to enter a 32 bit shift storage register 57. Under the control of the clock pulses, the storage slots of the shift register are succesfully filled by the 32 information bits of the input signal. After 32 clock pulses have been counted by the scaler it produces an output pulse. This pulse closes the bistable gate, thereby interrupting the flow of input pulses. In addition, it initiates the transfer of the data from the shift register, into an output register 58 and resets the shift register preparatory to receiving the next data sequence. The output register retains the data between data sequences. Its information is indicated on numerical indicators 60 to provide a numerical indication of the information contained within the message, as well as providing an input to a traffic control computer 61.

With reference to FIGURE 11, an aircraft traffic surveillance and control system is shown which illustrates the integrated functions of the portions of the system of the present invention which have been individually described in detail in the foregoing discussion.

All aircraft carry transmitters 65 which use the same frequency and which continuously transmit identity and altitude information automatically in a pulse code. Each transmitter repeats this information over and over without regard to any other transmitter.

Each of four suitably located ground receivers 66 picks up all pulses transmitted by all aircraft within the surveillance sector. The output of each receiver is relayed to a central ground facility through a microwave relay link or other suitable means.

For every block of airspace under surveillance, an output is taken at a suitable tap on each delay and fed into a correlator 70. Any time an aircraft is within that particular airspace, the correlator output will reproduce the coded message transmitted by that airplane. Airplanes in other blocks of airspace will not cause a response at the output of this particular correlator because of a lack of signal pulse coincidence. The outputs of the correlators can be connected to neon lights on a display and tracking board 71 for manual traffic control. This display can be so designed that the neon lights are placed on a map to represent the area under surveillance.

The output of any of the correlators can be monitored by a suitable readout device, such as shown in FIGURE 10 and described herein, to obtain identity, altitude, and other information being transmitted by aircraft within the surveillance area. The output of each correlator also can be fed into a suitable air traffic control computer 61 for automatic or semiautomatic air traffic control.

Having described only typical forms of the invention we do not wish to be limited to the specific details herein set forth, but wish to reserve to ourselves any variations or modifications that may appear to those skilled in the art and fall within the scope of the following claims.

We claim:

1. A vehicle surveillance system having a surveillance center for cooperating with a plurality of receivers arranged remotely from the station and each other, comprising, at least one vehicle transmitter emitting an identification signal to the plurality of receivers, a plurality of time delay devices located in the surveillance center arranged so that one time delay device is operately coupled with one receiver, each time delay device having a plurality of outputs wherein each output represents a selected time delay, a correlator connected to each time delay device via a selected output and adapted to pass the identification signal upon the occurrence of a signal coincidence among the selected outputs coupled to the correlator, and means coupled to the correlator for interpretating the signal information for vehicle identification and position.

2. An aircraft surveillance system having a ground station for cooperating with a plurality of receivers arranged remotely from the station and each other, comprising, at least one airborne transmitter continually emitting an identification and altitude signal to the plurality of receivers, a plurality of time delay devices located in the ground station and arranged so that one time delay device is operately coupled with one receiver, each time delay device having a plurality of outputs wherein each output is represented by a selected time delay, a correlator connected to each time delay device via a selected output and adapted to pass the identification and altitude signal upon the occurrence of a signal coincidence among the selected outputs coupled to correlator, and means coupled to the correlator for interpretating the signal information for aircraft identification, altitude and position.

3. An aircraft surveillance system having a ground station for cooperating with a plurality of receivers arranged remotely from the station and each other, comprising, an airborne transmitter carried by each aircraft in a surveillance area continually emitting an identification and altitude signal to the plurality of receivers, each airborne transmitter tuned to emit signal information on a single common predetermined frequency, a plurality of time delay devices located in the ground station arranged so that one time delay device is operately coupled with one receiver, each time delay device having a plurality of taps wherein each tap is represented by a selected time delay, a correlator connected to each time delay device via a selected tap and adapted to pass the identification and altitude signal upon the occurrence of a signal coincidence among the selected taps coupled to correlator, and means coupled to the correlator for interpretating the signal information for aircraft identification, altitude and position.

4. A vehicle surveillance system having a ground station for cooperating with a plurality of receivers arranged remotely from the station and each other, comprising, at least one vehicle transmitter emitting an identification signal to the plurality of receivers, a plurality of time delay devices located in the ground station arranged so that one time delay device is operately coupled with one receiver, each time delay device having a plurality of outputs wherein each output represents a selected time delay, a correlator connected to each time delay device via a selected output, each correlator having a signal coincidence circuit coupled to the selected delay line device output to pass the identification signal upon the occurrence of a signal coincidence of all the selected outputs coupled to the correlator, and means coupled to the correlator for receiving and interpreting the signal information for vehicle identification and position.

5. An aircraft surveillance system having a ground station for cooperating with a plurality of receivers arranged remotely from the station and each other, comprising, an airborne transmitter carried by each aircraft in a surveillance area continually emitting an identification and altitude signal to the plurality of receivers, each airborne transmitter tuned to emit signal information on a single common predetermined frequency, a plurality of time delay devices located in the ground station arranged so that one time delay device is operately coupled with one receiver, each time delay device having a plurality of taps wherein each tap is represented by a selected time delay, a correlator including an "and" gate connected to each time delay device via a selected tap and adapted to pass the identification and altitude signal upon the occurrence of a signal coincidence at the gate of all the selected taps coupled to said correlator, and means coupled to the correlator for interpreting the passed signal information for aircraft identification, altitude and position.

6. A vehicle surveillance system wherein a series of vehicle transmitted pulse signals are received by at least three geographically separated receivers at time intervals dependent upon the position of the vehicle within a surveillance area comprising a time delay device coupled to each receiver, each time delay device having a plurality of outputs representing a predetermined time delay, means associated with each time delay device via a selected time delay output for detecting at least a triple coincidence of the pulse signals indicative of the vehicle position within the surveillance area, display and indicating means coupled to the last mentioned means, circuit means responsive to the detection of such coincidence for actuating the indicator to record the series of pulse signals whereby vehicle identification and position are revealed.

7. A vehicle surveillance system wherein a series of vehicle transmitted pulse signals are received by four geographically separated receivers at time intervals dependent upon the position of the vehicle within a surveillance area comprising, a time delay device coupled to each receiver for introducing a time delay to each series of pulse signals received, each time delay device having a plurality of outputs representing a predetermined time delay, means associated with each time delay device via a selected time delay output for detecting at least a quadruple coincidence of the pulse signals indicative of the vehicle position within the surveillance area, display and indicating means coupled to the last mentioned means, circuit means responsive to the detection of such quadruple coincidence for actuating the display and indicator means to record the detected series of pulse signals whereby vehicle identification and position are revealed.

8. An aircraft surveillance system wherein a train of airborne transmitted pulse signals from several aircraft are received by at least four geographically separated receivers at time intervals dependent upon the position of the aircraft within a surveillance area comprising, a time delay device coupled to each receiver for introducing a time delay to each pulse signal train received, each time delay device having a plurality of taps representing a predetermined time delay, a coincidence gate means associated with each time delay device via a selected time delay tap for detecting at least a quadruple coincidence of the pulse signals indicative of the vehicle position within the surveillance area, display and indicating means coupled to the last mentioned means, and circuit means responsive to the detection of such coincidence for actuating the display and indicating means to record the series of pulse signals whereby vehicle identification and position are revealed.

9. The system as defined in claim 8 including, airborne transmitting apparatus for generating an aircraft identification and altitude code pulse train so that the display and indicating means records a selected aircraft identification and its altitude.

10. The system as defined in claim 8 including, a barometer coupled to the airborne transmitter and means controlled thereby for varying the pulses of the pulse code train transmitted to be indicative of aircraft altitude so that the display and indicating means sets forth aircraft altitude as well as aircraft identification.

11. An aircraft surveillance system for determining the position and altitude of a plurality of aircraft comprising, an airborne transmitter carried by each aircraft in a surveillance area for transmitting coded pulse signals representing aircraft identification and altitude, a plurality of geographically separated receivers for receiving the signals at time intervals dependent upon the position of the aircraft within the surveillance area, a time delay device coupled to each receiver for introducing a time delay to the received signals, each time delay device having a plurality of outputs representing a predetermined time delay, a multiplicity of quadruple coincidence means wherein each means is associated with a portion of the surveillance area, at least one output from each time delay device coupled to the last mentioned means so that quadruple coincidence of signals are detected indicative of aircraft position, and decoding means responsive to quadruple coincidence to decode and record aircraft position and altitude.

References Cited in the file of this patent
UNITED STATES PATENTS

| | | |
|---|---|---|
| 2,166,991 | Guanella | July 25, 1939 |
| 2,514,436 | Alvarez | July 11, 1950 |
| 2,786,193 | Rich | Mar. 19, 1957 |
| 2,897,351 | Melton | July 28, 1959 |
| 2,940,076 | Bissett et al. | June 7, 1960 |
| 2,962,714 | Meixell et al. | Nov. 29, 1960 |
| 2,972,742 | Ross | Feb. 21, 1961 |